Dec. 3, 1957   J. ADAMS, JR., ET AL   2,814,846
MECHANICAL BELT SPLICE
Filed Feb. 9, 1955   3 Sheets-Sheet 1
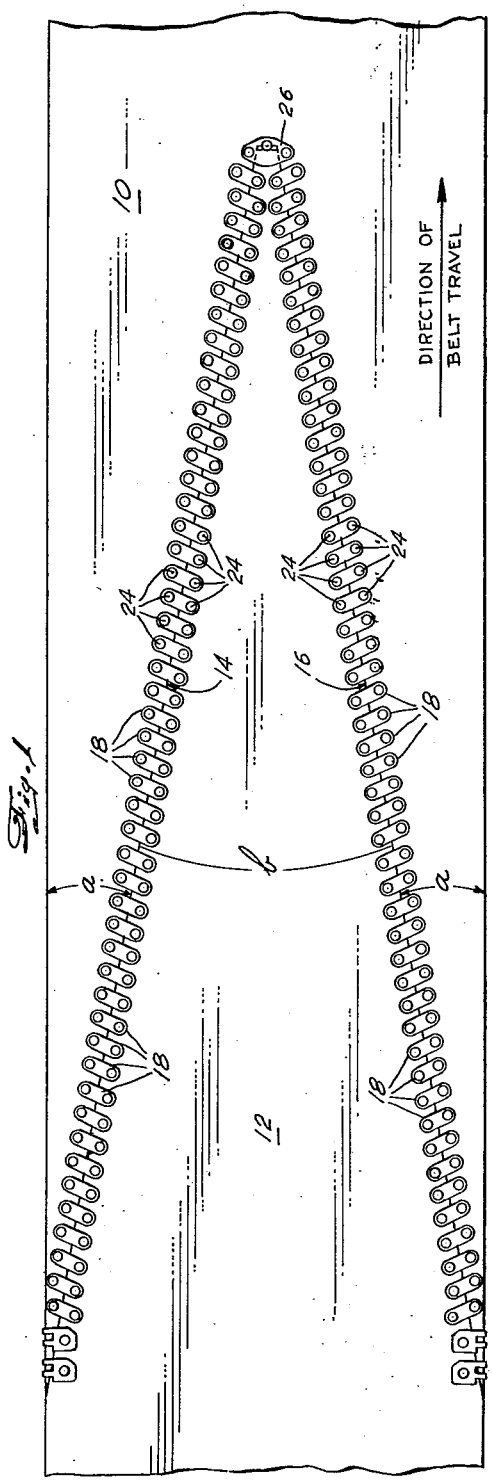
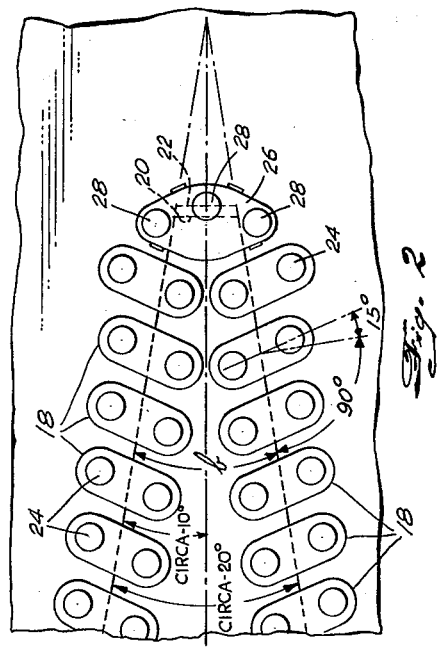
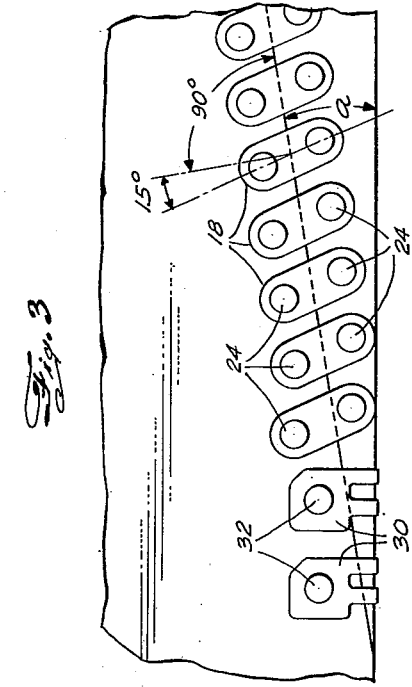
INVENTORS.
JAMES ADAMS, Jr.
JAMES A. KAY
BY
ATTORNEYS.

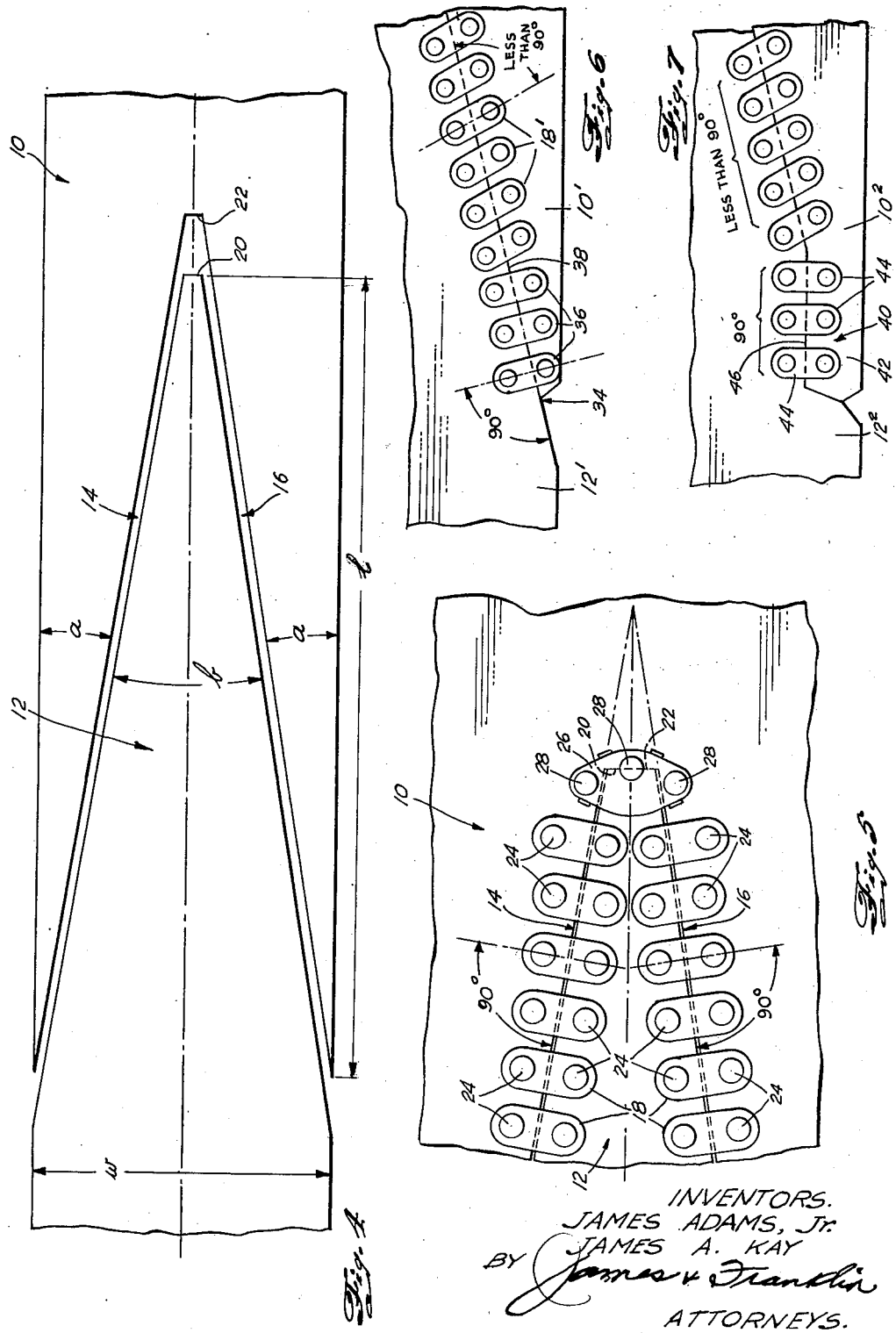

Dec. 3, 1957   J. ADAMS, JR., ET AL   2,814,846
MECHANICAL BELT SPLICE
Filed Feb. 9, 1955   3 Sheets-Sheet 3

INVENTORS
JAMES ADAMS, Jr.
JAMES A. KAY
BY
ATTORNEYS

United States Patent Office

2,814,846
Patented Dec. 3, 1957

---

2,814,846

MECHANICAL BELT SPLICE

James Adams, Jr., Packanack Lake, and James A. Kay, Clifton, N. J., assignors to Raybestos-Manhattan, Inc., Passaic, N. J., a corporation of New Jersey Application February 9, 1955, Serial No. 487,169

12 Claims. (Cl. 24—38)

This invention relates to an improved mechanical belt splice, and relates more particularly to a flat split splice for belts such as conveyor belts in which the belt ends to be spliced are united or joined by mechanical fasteners.

It is frequently necessary and convenient to join or fasten securely the ends of a flat belt on the job location where the belt will be or is being used. Most conveyor belts are so fastened because of their great length or to alter their length in the course of service or to repair damaged portions of the belt.

Heretofore, conveyor belts joined mechanically have never been as strong or durable at the joint as belts which are joined by vulcanization or by a vulcanized splice. Hence in the industry, capacity ratings for conveyor belts are always lower for belts joined with mechanical fasteners than for the same belts joined with vulcanized splices. Notwithstanding that mechanical joints heretofore have less capacity rating than vulcanized splices, nevertheless most conveyor belts are joined mechanically because of the ease and convenience of installing mechanical fasteners. Whereas, a good vulcanized splice requires considerable skill and care of trained workmen, expensive heavy vulcanizing equipment, and considerable time to accomplish, a mechanical joint can be installed by a workman of ordinary skill and experience, with a few inexpensive common tools and in a much shorter time.

Mechanical joints heretofore have imposed a capacity limitation on the belts and have restricted the kinds and constructions of conveyor belts to strength members capable of holding mechanical fasteners. For example, conveyor strength member fabrics which are to hold fasteners well must contain rather heavy and strong weft yarn components to prevent the combing out of the mechanical fastener. Such fabrics are relatively thick and a relatively high percentage of cost is consumed in the weft yarns for the main purpose of holding fasteners. A belt strength member fabric which is weftless has very little mechanical fastener holding ability. Such fabrics are frequently used as the strength member of high tension and high capacity conveyor belts because the fabric weight and cost and strength is in the warp direction making the most efficient use of the fabric strength and permitting the strongest yet the thinnest strength members. Heretofore, belts made with a weftless fabric are of necessity joined by vulcanized splices.

It is the prime object of the present invention to produce a mechanical belt splice which will have the strength, reliability and durability of a vulcanized splice. Such a mechanical belt splice not only can be installed by workmen of ordinary skill and experience and with tools and equipment ordinarily used in the making of heretofore mechanical joints, but with the present improvement can be applied with equal efficiency to belts made of weftless strength member fabric which heretofore could only be joined by vulcanized splices (as well as to belts made with fabric strength members containing substantial weft strength as found in conventional weave ducks). We have discovered that such an improved mechanical belt splice may be obtained by the correct patterning of the spliced belt ends and the cooperative arrangement, spacing and orientation of the mechanical fastening means therefor.

To balance the forces which are brought into action under belt tension, we prefer to apply the patterning of our belt to a chevron shape splice (in itself already known), i. e., to one in which the contiguous belt ends to be joined are cut in opposed V shapes, although the principles of our invention are not limited to chevron contoured splices. We have discovered primarily that when the line of splice is extended longitudinally of the belt so as to make an angle with the side of the belt of the order of 10° (e. g., between 7½° to 15°), which when applied to the angle of the chevron in a chevron-shaped splice would be of the order of 20° (e. g., between 15° and 30°), a splice of critically increased strength, reliability and durability is obtained.

We have further found that with the described patterning of the belt ends, the mechanical fasteners, spaced consecutively along the line or lines of the splice, should be made to extend across the splice line at a substantially 90° angle with reference thereto and should be so joined or attached to the belt ends as to permit a rotative reorientation of the fasteners under belt tensioning. Such a reorientation results in bringing the opposed belt ends into compressed abutment at the line or lines of the splice. We have found that the result is a sealing compression of the belt ends at the splice lines, that moreover remains permanent even after tension is removed from the joint. Also this sealed joining of the belt ends relieves the fasteners themselves of some strain under tension, this being a factor in increasing the useful life of the mechanical splice. Where the splice is in the shape of a chevron, the compressive forces are at balance on the opposite sides of a longitudinal medial line of the belt, and the belt is made to retain or hold a strictly linear shape and movement in action.

The said rotative reorientation of the fasteners has the effect of producing a linear displacement of one belt end with reference to the other, which in the chevron-shaped splice results in an opening or space appearing at the apex of the V or chevron. This chevron apex we prefer to make in truncated form. We have further discovered that the degree of rotative reorientation (which is of the order of from 5° to 15°) may be reduced and the extent of said linear displacement minimized (and thus the size or extent of said apex opening may be lessened) if the fasteners are initially arranged so as to extend across the splice line at an angle of from 5° to 15° to the aforesaid 90° angle, measured in the direction of said rotative reorientation.

To the accomplishment of the foregoing, and such other objects as may hereinafter appear, our invention relates to the mechanical belt splice as sought to be defined in the appended claims taken together with the following specification and the attached drawings, in which:

Fig. 1 is a plan view of a belt such as a conveyor belt embodying the mechanical belt splice of our present invention;

Fig. 2 is a fragmentary enlarged view of the leading tip of the belt splice shown in Fig. 1;

Fig. 3 is a fragmentary enlarged view of the trailing tip of the belt splice shown in Fig. 1;

Fig. 4 is a view depicting a cutting diagram for cutting the belt ends preparatory to making the splice;

Fig. 5 is a view similar to Fig. 2 explanatory of some of the principles embodied in making the mechanical belt splice;

Figs. 6 and 7 are views of modified structures, and

Figure 8:
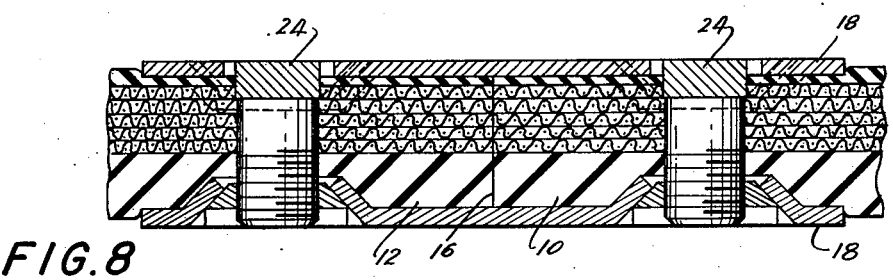
Fig. 8 is a view, shown on an enlarged scale, depicting the manner in which the splice is joined by one of the mechanical fasteners, this view being taken in cross-section along a medial line longitudinally of the fasteners such as indicated in Fig. 3 of the drawings.
Figure 9:
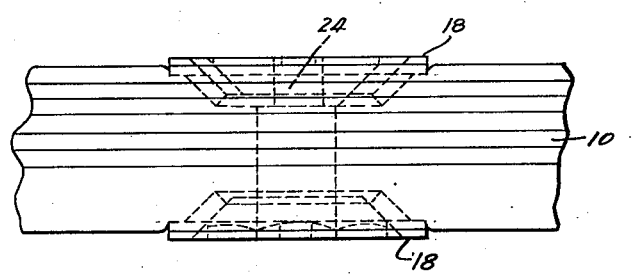
Fig. 9 is a view of Fig. 8 taken at right angles thereto.
Figure 10:
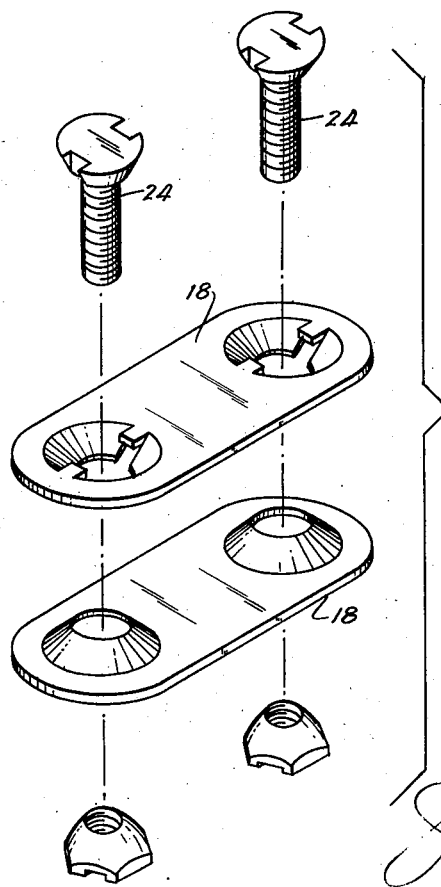
Fig. 10 is an exploded view of one of the mechanical fasteners.

Referring now more in detail to the drawings and having reference first to Fig. 1 thereof, the belt splice comprises belt ends 10 and 12 patterned to produce the splice lines 14 and 16, the belt ends being joined along the splice lines 14 and 16 by a series of mechanical fasteners 18, 18 spaced consecutively along and extending transversely across the splice lines as depicted in Fig. 1 of the drawings.

Preferably the patterning of the belt is applied to a chevron-shaped splice, i. e., to one in which the contiguous belt ends to be joined are cut in opposed V shapes. Thus referring now to Fig. 4 of the drawings the contiguous belt ends 10 and 12 are cut in opposed V shapes to interfit and form the chevron-shaped splice referred to. We have found, as aforesaid, that when the line of the splice is extended longitudinally of the belt so as to make an angle with the side of the belt of the order of 10°, that is to say, within a range of 7½° to 15°, a splice of a critically increased strength, reliability and durability is achieved. This angle $a$ in Fig. 4 of the drawings is 10°. When the splice is patterned in the shape of a chevron the angle of the chevron apex should, therefore, be of the order of 20°, that is to say, in a range between 15° and 30°. In the patterning of the parts shown in Fig. 4 this chevron apex angle, designated as $b$, is shown as 20°. The lead, that is to say, the ratio of the altitude $l$ of the chevron splice and the width $w$ of the belt (which latter, for example, may be 30") as shown in the figures, is 3:1. We prefer to cut the belt ends in a slightly truncated V-shape so that the two ends of the belt interfit or mate precisely with each other; and to accomplish this the apex ends are cut off squarely as at 20 and 22.

The mechanical fasteners 18, 18 are laid out along both lines of the chevron splice in the manner depicted in the drawings, and are attached to the belt ends to effect the joining thereof. The mechanical fasteners preferably comprise metal plates arranged on opposite sides or faces of the belt ends secured together and to the belt ends by means of bolts 24, 24. The said fasteners 18, 18 are arranged along the lines of the splice in closely spaced relation, the principle being to utilize a large number of mechanical fasteners thereby decreasing the load per fastener on the belt.

With this patterning of the belt ends and the arrangement, spacing and orientation of the mechanical fasteners, as depicted in the drawings, a splice of critically increased strength and durability is obtained. The following table shows a typical relationship between the angle of the splice V, the load per fastener, and the relative durability as found by extensive experimental work and trial.

|  | Total tension load per fastener, lbs. | Relative life durability |
| --- | --- | --- |
| Straight across joint | 376 | 1 |
| Truncated V-joint: |  |  |
| Lead ½, angle 90° | 270 | 4 |
| Lead 1, angle 50° | 167 | 25 |
| Lead 1½, angle 37° | 125 | 81 |
| Lead 2, angle 28° | 97 | 222 |
| Lead 2½, angle 22° | 98 | 527 |
| Lead 3, angle 19° | 67 | 990 |
| Lead 3½, angle 17° | 60 | 1,400 |
| Lead 4, angle 15° | 53 | 2,400 |

From this table it will be found that there is a sharp or critical increase in the relative life or durability of the splice when the angle of the V-joint is of the order of 20°, that is to say, particularly within a range of 15° to 30°.

We have found, as aforesaid, that the fasteners should be made to extend across the splice lines at a substantially 90° angle with reference thereto, and that the fasteners should be so joined or attached to the belt ends 10 and 12 as to permit a rotative reorientation of the fasteners under belt tensioning. This principle is illustrated by the relations shown in Figs. 5 and 2 of the drawings. In Fig. 5 the belt ends 10 and 12 are shown joined with the fastener plates 18, 18, each arranged at an angle of 90° with reference to the splice lines 14 and 16. Each of the fastener plates 18 is shown attached at each of its opposing ends or points to a belt end by means of a single bolt 24, the bolt thereby capable of acting as a pivot axis for a rotative reorientation of the fastener plates. For explanatory purposes the cut edges (14, 16) of the belt ends making up the splice are shown in Fig. 5 slightly displaced. We have found that when the belt is placed under tension the parts move from the positions shown in Fig. 5 to the positions shown in Fig. 2. In doing so the fastener plates 18, 18 have rotated from the 90° position shown in Fig. 5 at an angle of from 10° to 15°. This reorientation results in bringing the opposed belt ends into compressed abutment along the lines 14 and 16 of the splice. We have found that the result is a sealed compression of the belt ends at the splice lines which, moreover, remains permanent even after tension is removed from the belt. This sealed joining of the belt ends also has the effect of relieving the fasteners 18, 18 themselves of some strain under tension, this also being a factor in increasing the useful life of the mechanical splice. Where the splice is in the shape of a chevron, as illustrated, the compressive and sealing forces are at balance on the opposite sides of a longitudinal medial line of the belt, and the belt is made to retain or hold a strictly linear shape and movement in action.

We find that it is desirable to anticipate this rotative reorientation of the fastener plates by locating the plates, for example, 5°, 10° or 15° in the direction they would tend to rotate. The aforesaid reorientation produces a linear displacement of one belt end with reference to the other which, in the chevron-shaped splice results in an opening or space appearing at the apex of the V or chevron defined by the now pulled apart or spaced ends 20 and 22. By anticipating the rotation and by initially arranging the fastener plates 18, 18 so as to extend across the splice lines at an angle of 5° to 15° to the 90° angle referred to measured in the direction of said rotative reorientation, relative displacement of the belt ends is minimized, the rotative movement of the fasteners is reduced, and the opening at the apex is lessened. The fasteners, therefore, are preferably initially arranged at such an angle ranging from 5° to 15°, the 15° angle being illustrated in Figs. 1 to 3 of the drawings.

The opening that forms at the chevron apex is preferably covered or sealed with escutcheon plates 26 arranged on the top and bottom of the belt and held together and attached to the belt end 10 by the bolts 28, 28. At the trailing tip of the splice hinge type fasteners 30, 30 are employed, the opposite sides of which are secured together and attached to the belt end 12 by means of the bolts 32, 32.

In Fig. 6 of the drawings is shown a modified form of structure particularly for the trailing tip of the splice. We have found that the stresses that develop particularly at the trailing tip may be regulated by varying the angle of the fastener plates thereat with respect to the fastener plates along the remainder of the splice. This is especially desirable when the splice is applied to conveyor belts in the higher tension range (600 to 1,000 lbs. per inch of width operating tension). We have found that the durability of the fasteners adjacent the edges of the belt may be increased by installing these near-the-edge fasteners more nearly at right angles; this gives extra protection to the splice tips at the edges of the belt where the belt is more subject to extra stress due either to accidental interferences and obstructions or to twists in the belt in climbing the wing idlers in troughing. Accordingly, in Fig. 6 of the drawings the belt ends 10', and 12' are patterned at the trailing end of the splice as indicated at 34, and the belt portions at the trailing end are joined by the fasteners 36, as illustrated in Fig. 6, these fasteners being arranged at an angle of substantially 90° to the splice line 38. The remaining fasteners 18', 18' are arranged at an angle of less than 90° following the principles set forth above.

We have further found that increased anchorage durability at the edges may be obtained by straightening the splice line at the trailing end of the splice as illustrated in the structure shown in Fig. 7 of the drawings. According to this modification the belt ends $10^2$ and $12^2$ are patterned at the trailing end of the splice in the manner indicated at 40 in Fig. 7, this patterning extending the legs of the V splice beyond the V shape to extend as a straight border 42 a short distance along the edges of the belt. This permits additional fasteners to be installed at the trailing edge. The fastener plates 44, 44 on the straight portion are substantially at right angles to the splice line 46 in this region of the belt. These fastener plates 44 (as well as the fastener plates 36 of the Fig. 6 modification) are supplied in lieu of the hinge type fasteners 30, 30 employed in the form of the invention shown in Figs. 1 to 5 of the drawings.

The manner of making or installing a splice within the principles of our invention will, in the main, be fully apparent from the above detailed description thereof. The ends of the belt are patterned in the manner shown in Fig. 4. The fasteners and fastener holes are located by suitable templates. The fasteners are then mounted and attached, after which the lead tip escutcheon plates and the trial tip fasteners are secured in position.

It will be apparent that while we have depicted the embodiment of the invention in its preferred forms, that many changes may be made in the structure of the mechanical splice without departing from the principles of the invention as described in the following claims.

We claim:

1. A belt splice comprising contiguous belt ends cut in opposed V shapes to interfit and form a chevron shaped splice, mechanical fasteners joining the opposed belt ends and spaced consecutively along both lines of the formed chevron splice, said fasteners extending across the splice lines at a substantially 90° angle with reference thereto, the fasteners being pivoted at opposed points to the belt ends so as to permit a rotative reorientation of the fasteners under belt tension to bring the opposed belt ends into compressed abutment at the lines of the splice.

2. The belt splice of claim 1 in which the fasteners are initially arranged so as to extend across the splice lines at an angle of from 5° to 15° to said 90° angle measured in the direction of said rotative reorientation.

3. The belt splice of claim 1 in which the angle of the V of the chevron is not greater than 30°.

4. The belt splice of claim 18 in which the angle of the V of the chevron is in the range between 15° and 30°.

5. The belt splice of claim 1 in which the angle of the V of the chevron is of the order of 20°.

6. The belt splice of claim 1 in which the opposed V-shaped belt ends are truncated and in which an escutcheon plate is attached to the belt over the opening that forms at the truncation.

7. The belt splice of claim 1 in which the mechanical fasteners comprise metal fastener plates, each of which is attached at each of the said opposed points to a belt end by means of a single bolt, said bolt acting as the pivot axis for said rotative reorientation.

8. A belt splice comprising contiguous belt ends cut at an acute angle to the belt length, the cut ends in opposed relation interfitting to form a splice, mechanical fasteners joining the opposed belt ends and spaced consecutively along the line of the splice, said fasteners extending across the splice at a substantially 90° angle with reference thereto, the fasteners being pivoted at opposed points to the belt ends so as to permit rotative reorientation of the fasteners under belt tension to bring the opposed belt ends into compressed abutment at the line of the splice.

9. The belt splice of claim 8 in which the angle of the cut end of the belt is not greater than 15°.

10. The belt splice of claim 8 in which the angle of the cut end of the belt is of the order of 10°.

11. The belt splice of claim 8 in which the fasteners are initially arranged so as to extend across the splice line at an angle from 5° to 15° to said 90° angle measured in the direction of said rotative reorientation.

12. The belt splice of claim 8 in which the mechanical fasteners comprise metal fastener plates, each of which is attached at each of its opposed ends to a belt end by means of a single bolt, said bolt acting as the pivot axis for said rotative reorientation.

References Cited in the file of this patent

UNITED STATES PATENTS

| | | |
|---|---|---|
| 24,243 | Smith | May 31, 1859 |
| 153,153 | Burt | July 21, 1874 |
| 465,995 | Jackson | Dec. 29, 1891 |
| 1,134,139 | Kennedy | Apr. 6, 1915 |
| 2,461,859 | Vasselli | Feb. 15, 1949 |

FOREIGN PATENTS

| | | |
|---|---|---|
| 836 | Great Britain | 1881 |
| 141,991 | Germany | Sept. 28, 1903 |